United States Patent
Tan et al.

(10) Patent No.: US 12,555,889 B2
(45) Date of Patent: Feb. 17, 2026

(54) ANTENNA FIXING ASSEMBLY AND INTERACTIVE BOARD

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Jinghuan Tan, Guangzhou (CN); Guofeng Hong, Guangzhou (CN); Bingjie Deng, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 49 days.

(21) Appl. No.: 18/639,932

(22) Filed: Apr. 18, 2024

(65) Prior Publication Data
US 2024/0266714 A1 Aug. 8, 2024

Related U.S. Application Data

(63) Continuation of application No. PCT/CN2022/122153, filed on Sep. 28, 2022.

(51) Int. Cl.
*H01Q 1/12* (2006.01)
*H01Q 1/22* (2006.01)
*H01Q 1/24* (2006.01)

(52) U.S. Cl.
CPC .................................. *H01Q 1/22* (2013.01)

(58) Field of Classification Search
CPC .......... H01Q 1/12; H01Q 1/1207; H01Q 1/22; H01Q 1/24; H01Q 1/2291; H01Q 1/42
See application file for complete search history.

(56) References Cited

U.S. PATENT DOCUMENTS

| | | | |
|---|---|---|---|
| 6,853,336 B2* | 2/2005 | Asano | H01Q 1/44 |
| | | | 343/702 |
| 10,476,127 B2* | 11/2019 | Kim | H01Q 1/1207 |
| 10,797,380 B2* | 10/2020 | Roy | H05K 5/0204 |
| 11,018,415 B2* | 5/2021 | Kim | H01Q 1/42 |
| 11,228,084 B2* | 1/2022 | Hayakawa | H01Q 1/22 |
| 2021/0089092 A1* | 3/2021 | Huang | G06F 1/1654 |

* cited by examiner

*Primary Examiner* — Tho G Phan
(74) *Attorney, Agent, or Firm* — BAYES PLLC

(57) ABSTRACT

The present disclosure provides a camera device, including a housing assembly, and a camera module. The housing assembly includes a front housing, a rear housing, a housing body, and a first installation pin. The housing body is equipped with a first positioning hole. The first installation pin passes through the first positioning hole, and two opposite ends of the first installation pin are fixed to the front housing and the rear housing respectively to fix and connect the front housing and the rear housing. The housing body is tightly clamped by and fixed between the front housing and the rear housing. An installation space is surrounded by the front housing, housing body, and rear housing. The camera module is located in the installation space and fixed to the housing assembly. The camera device has a housing body clamped tightly by and fixed between the front housing and the rear housing.

20 Claims, 15 Drawing Sheets

ANTENNA FIXING ASSEMBLY AND INTERACTIVE BOARD

CROSS-REFERENCE TO RELATED APPLICATION

The present application is a continuation of International Application No. PCT/CN2022/122153, filed on Sep. 28, 2022. The entire content of the above-identified application is expressly incorporated herein by reference.

TECHNICAL FIELD

The present disclosure relates to the technology field of electronic devices, in particular, to an antenna fixing assembly and an interactive board.

TECHNICAL BACKGROUND

At present, in order to achieve network communication function, an interactive board is generally provided with an antenna module. The antenna module is usually fixed and installed inside a housing of the interactive board for the sake of beautiful appearance of the device. However, due to the structural construction and obstruction of the housing of the interactive board, the current antenna modules have problems such as complex disassembly and assembly, poor assembly stability, and poor signal quality.

SUMMARY

The object of the present disclosure is to provide an antenna fixing assembly and an interactive board, which solves the problems of difficult disassembly and assembly of antenna modules, poor assembly stability, and poor signal.

In order to solve the above-mentioned technical problems, the following technical solutions are adopted in the present disclosure.

According to a first aspect, an antenna fixing assembly is provided, including:
  a frame body, where the frame body provides an installation space for accommodating functional modules, and the frame body is provided with a through hole communicating with the installation space;
  an installation bracket, where the installation bracket is detachably connected to the frame body and is at least partially placed in the installation space, the installation bracket includes a first installation portion that is arranged on a side of the installation bracket close to the through hole, and a first installation gap is formed between the first installation portion and the frame body; and
  an antenna module, where the antenna module is placed within the first installation gap, and the antenna module is movable with the installation bracket to abut against or detach from the frame body when being assembled on the frame body,
  when the antenna module is assembled on the frame body, the antenna module is at least partially disposed corresponding to the through hole so as to be exposed to the outside of the frame body through the through hole.

According to a second aspect, an interactive board is provided, including:
  the antenna fixing assembly as described above, the through hole is opened on a front side of the frame body, so that when the antenna module is assembled on the frame body, a signal receiving and transmitting direction of the antenna module faces the front of the interactive board.

The beneficial effect of the present disclosure is that: the antenna fixing assembly is provided with a detachable installation bracket inside the frame body, so that the installation bracket can provide an operator with an operating position; the antenna module can move with the installation bracket, so that the operator only needs to operate the installation bracket during the process of disassembling and assembling the antenna module; the disassembly and assembly of the antenna module relative to the frame body can be achieved by installing the installation bracket on the frame body, or removing the installation bracket from the frame body; the installation bracket is easier to be operated than that of the antenna module, and is less prone to damage compared with the antenna module, which is beneficial for the operator to operate during the process of disassembling and assembling the antenna module, thereby reducing the difficulty of disassembly and assembly of the antenna module, improving its disassembly efficiency, and also improving the assembly stability of the antenna module on the frame body, ensuring that the antenna module maintains its normal working state, and extending the service life of the module.

BRIEF DESCRIPTION OF DRAWINGS

The present disclosure will be further explained in detail based on the accompanying drawings and embodiments.

Figure 1:
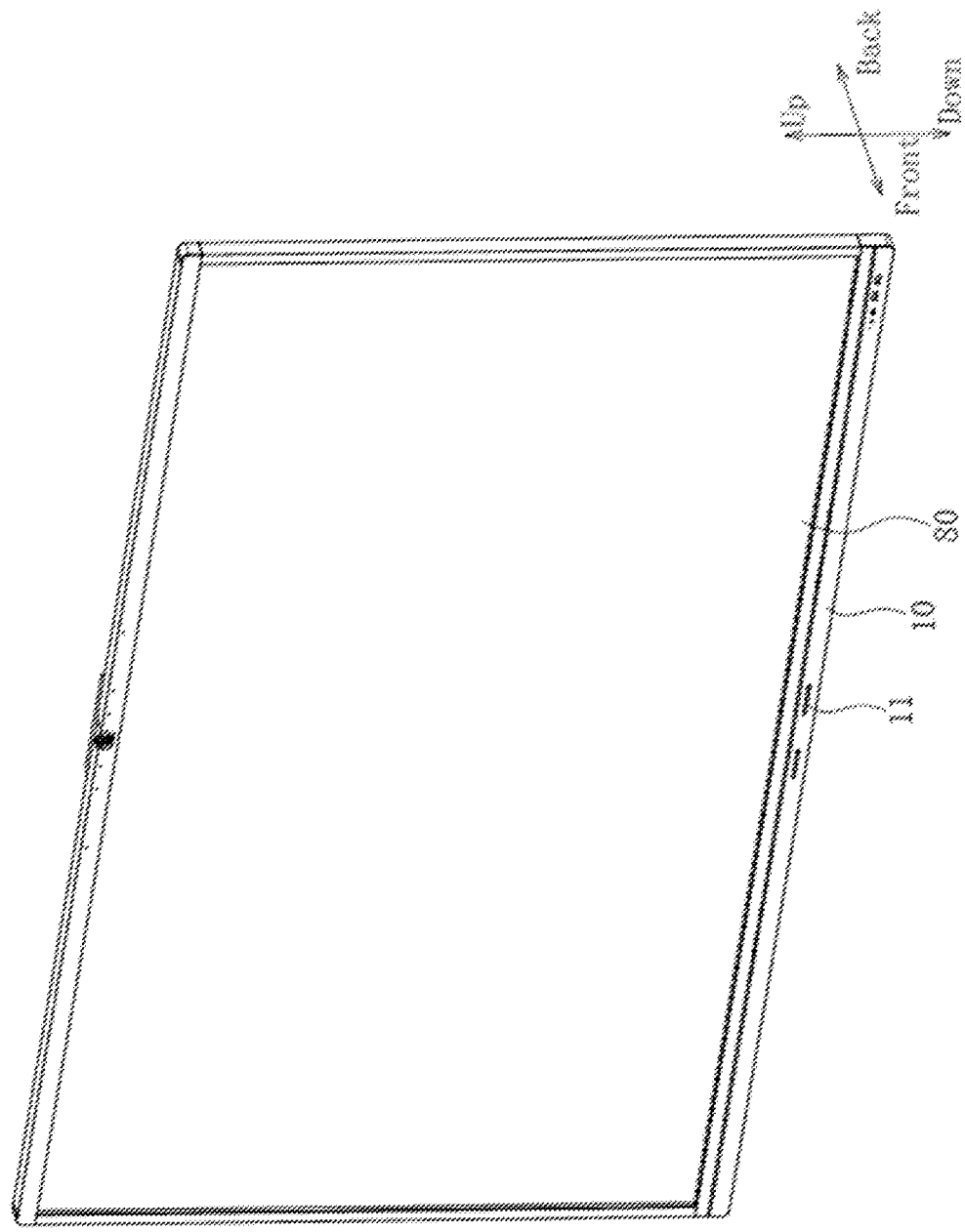
FIG. 1 illustrates a structural schematic diagram of an interactive board according to some embodiments of the present disclosure.

Explanation of reference numerals in the drawing: 10. Frame body; 11. Through hole; 12. Installation port; 13. Fixing hole; 20. Installation bracket; 21. First installation portion; 211. Double-sided adhesive; 212. Limiting block; 213. First installation gap; 22. Limiting part; 23. Buckle edge; 24. First positioning pin; 25. Pocket hole; 26. Fixing arm; 261. Reference hole; 27. Second installation portion; 271. Limiting plate; 272. Second elastic buckle; 273. Second positioning pin; 30. Cover plate; 31. First elastic buckle; 32. First positioning hole; 33. Protrusion; 40. First antenna plate; 50. Second antenna plate; 51. Electric connection piece; 60. Interface board; 61. Second positioning hole; 62. Conductive spring piece; 70. Shielding cover; 80. Display module; and 90. Rear cover.

DETAILED DESCRIPTION

In order to make the technical problems to be solved, the technical solutions to be adopted and the technical effects to be achieved in the present disclosure clearer, the technical solutions of embodiments of the present disclosure will be further described in detail hereinafter in combination with the accompanying drawings. Obviously, the described embodiments are only a part of embodiments of the present disclosure, not all of embodiments of the present disclosure. Based on the embodiments of the present disclosure, all other embodiments obtained by those skilled in the art without creative work belong to the claimed scope of the present disclosure.

In the description of the present disclosure, unless otherwise specified and limited, the terms "connected with/to," "connected," and "fixed" should be interpreted broadly. For example, they may be fixedly connected, detachably connected, or integrated. It may be a mechanical connection or an electrical connection. And they may be directly connected or indirectly connected through an intermediate medium, or, they may be the connection between two components or the interaction relationship between two components. For those skilled in the art, the concrete meaning of the above-mentioned terms in the present disclosure may be understood under concrete circumstances.

In the present disclosure, unless expressly stipulated and defined otherwise, a first feature being "above" or "below" a second feature may include that the first feature directly contacts with the second feature, or may include that the first feature does not directly contact with the second feature, rather than contact through another feature therebetween. Moreover, the first feature being "above," "over," and "on" the second feature may comprise that the first feature is directly above and obliquely above the second feature, or simply means that the level of the first feature is higher than that of the second feature. The first feature being "below," "under," and "underneath" the second feature includes that the first feature is directly below and obliquely below the second feature, or simply means that the level of the first feature is smaller than that of the second feature.

At present, a commonly used assembly manner for functional modules in the field of electronic devices is to fix the functional modules (antenna module, human detection module, camera module, etc.) inside the device frame through the installation structure, so as to achieve an effect of fixing the functional modules. During the process of assembling functional modules, an operator needs to first place the functional modules inside the device frame, and then fix them by operating the installation structure, or operate the installation structure to detach it from the device frame, and then remove the functional module. However, due to a limited installation space inside the device frame, it is difficult to operate the functional modules during the disassembly and assembly process. For example, such a situation where it is difficult for the operator to place the functional modules inside the device frame, it is difficult to operate the installation structure in real-time after placing the functional modules inside the device frame, or it is difficult to remove the antenna modules from the device frame often occurs, which increases the difficulty of disassembly and assembly of the functional modules and reduces their efficiency. Moreover, due to the high difficulty of assembling functional modules, it is difficult to assemble them in place within the device frame. The assembly state of functional modules is unstable, which may cause changes in the installation position of antenna modules during subsequent handling and use, resulting in affecting their normal operation and increasing the failure rate of electronic devices.

In order to solve the above problems, the disclosure of this application proposes an antenna fixing assembly in the embodiments of the present disclosure and an interactive board applying the antenna fixing assembly.

In order to enable those skilled in the field to better understand the solution of the present disclosure, a clear and complete description of the technical solution in the embodiments of the present disclosure will be provided in conjunction with the accompanying drawings hereinafter. Obviously, the described embodiments are only a part of the embodiments of the present disclosure, not all of them. Based on the embodiments in the present disclosure, all other embodiments obtained by those skilled in the art without creative labor fall within the claimed scope in the present disclosure.

It should be noted that the electronic devices described in this embodiment are generally devices that utilize electronic technology (including software) so as to achieve human-machine interaction functions to a certain extent, which includes but not limited to electronic computers, robots, display terminals, etc.

In this embodiment, an interactive board is used as electronic devices applying an antenna fixing assembly. It may be understood that the interactive board may be used as a display device such as a conference tablet, interactive blackboard, commercial display, etc. Clearly, it may also be applied to display devices such as televisions and computer displays. Interactive boards may operate the content displayed on the display screen and achieve human-machine interaction through touch technology, which integrates one or more functions such as projectors, whiteboards, screens, audio systems, televisions, and video conferencing terminals. In practical applications, the hardware part of the interactive board is composed of a touch module, a display module 80, and an intelligent processing system, which are combined with the overall structural components and supported by a dedicated software system. The display module 80 is combined with the touch module to achieve display and touch functions. Users may use their fingers or stylus to perform touch operations on the display screen. The intelligent processing system generates handwriting based on the touch operations input by a user and displays them on the display screen, or generates control operations based on the touch operations input by the user to process the displayed content on the display screen.

Typically, interactive boards are installed with at least one type of operating system, including but not limited to Android, Harmony, Linux, and Windows systems. Touch operations received through the display module 80 are processed through the operating system. Typically, an interactive board may install at least one application based on the operating system, such as a whiteboard application installed in the interactive board.

Clearly, the antenna fixing assembly according to this embodiment may further be applied to other display devices that do not have touch control functions, such as LCD displays that only have display functions, and even electronic devices that do not have display functions.

Figure 2:
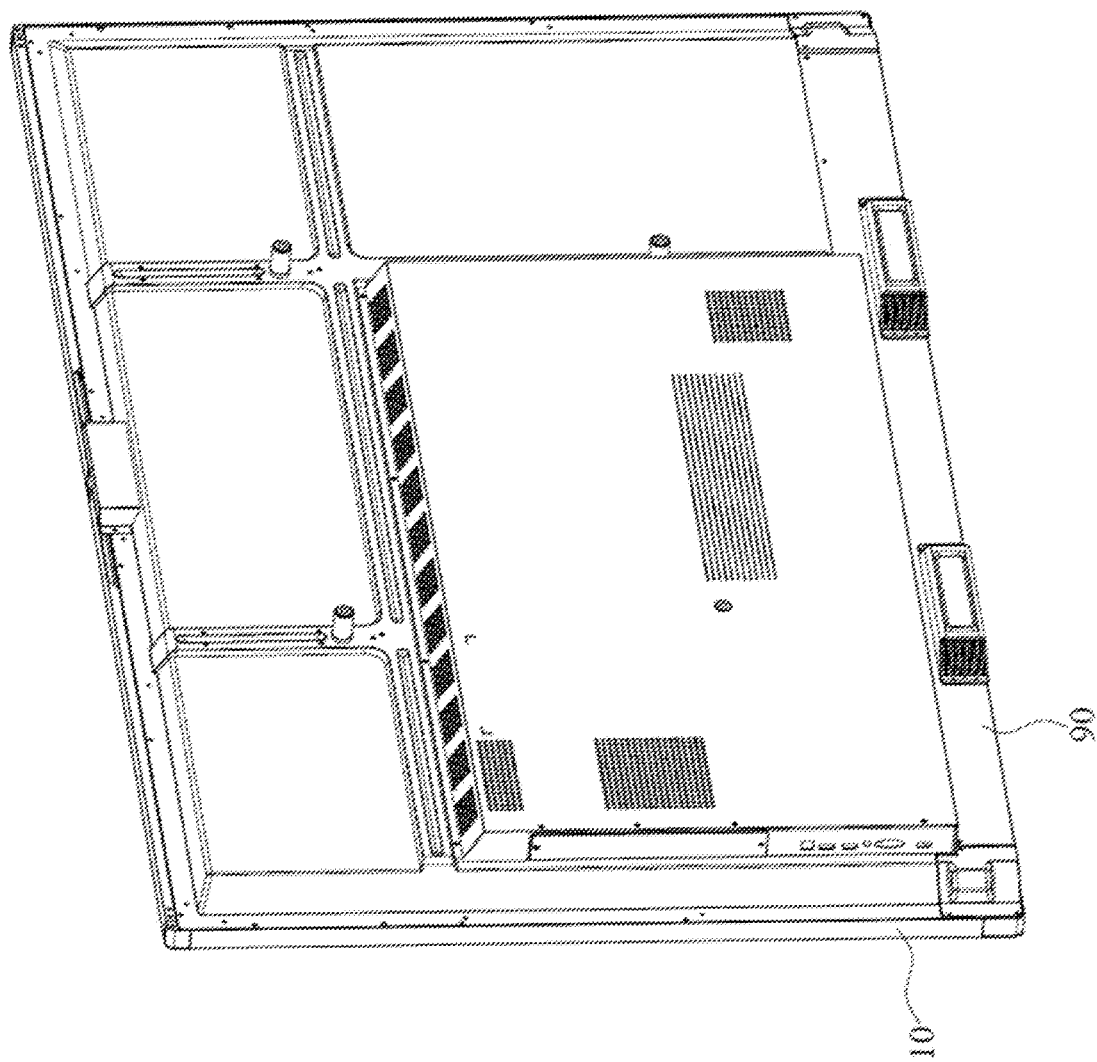
FIG. 2 illustrates another structural schematic diagram of the interactive board according to some embodiments of the present disclosure.
Figure 3:
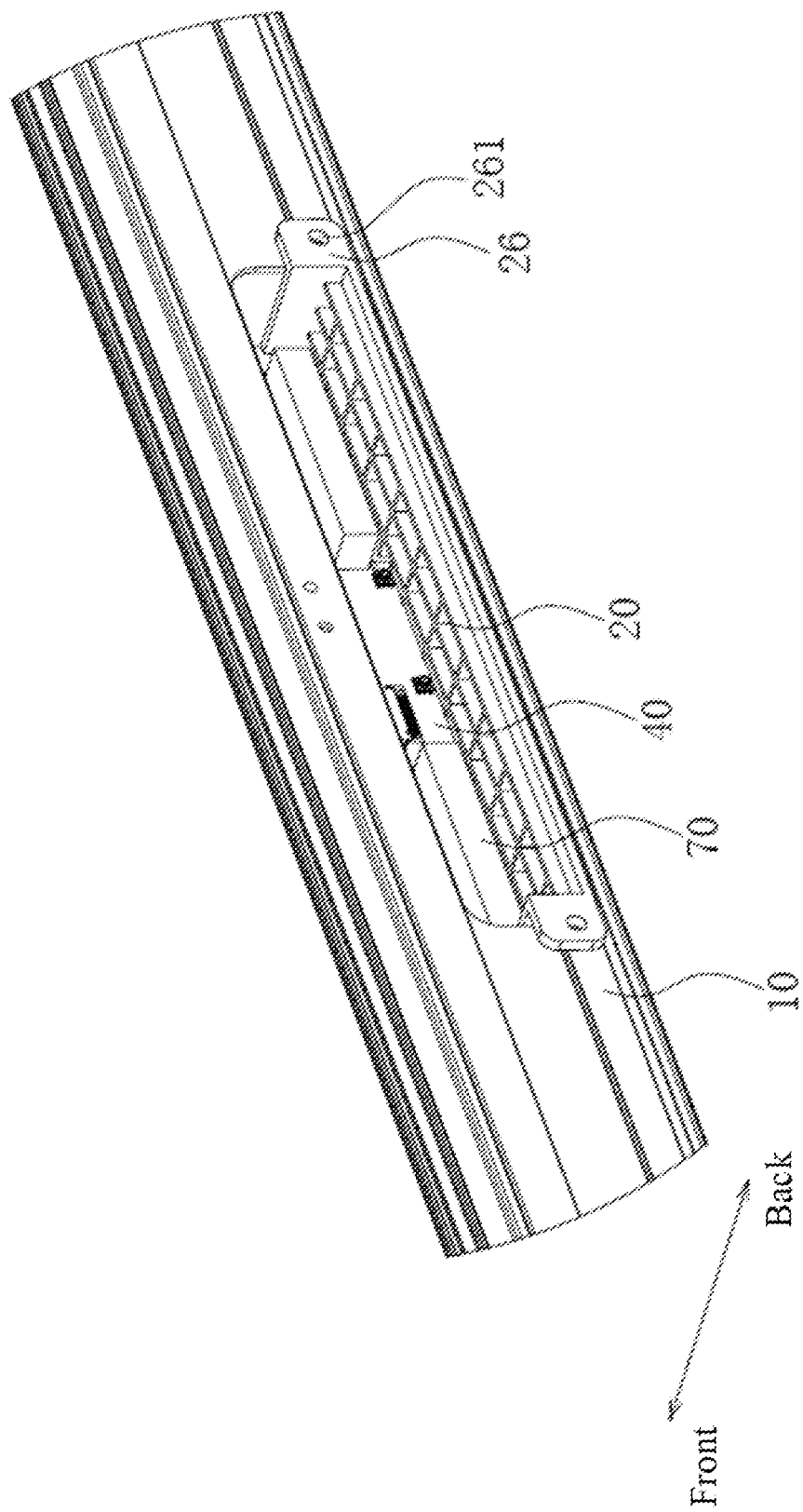
FIG. 3 illustrates a schematic diagram of an assembly state of the antenna fixing assembly according to some embodiments of the present disclosure.
Figure 4:
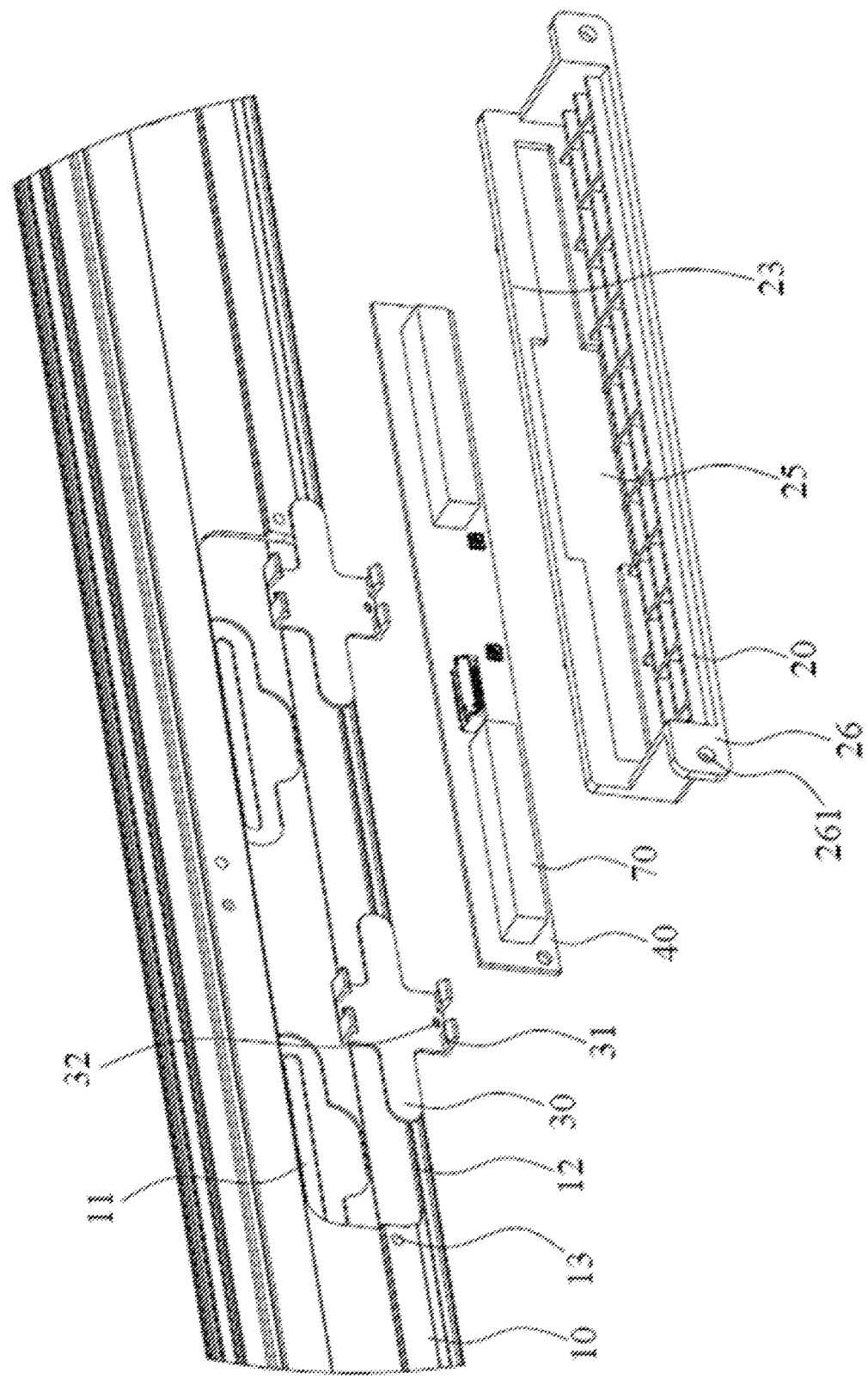
FIG. 4 illustrates an exploded view of the antenna fixing assembly according to some embodiments of the present disclosure.

The electronic device according to this embodiment is connected to the antenna module via a control unit, so as to send corresponding digital signals to the antenna module or to receive digital signals converted from communication signals by the antenna module. It may be understood that, as shown in FIGS. 1-2, in the case of using an interactive board as the electronic device of this embodiment, in addition to a control unit, the interactive board includes a display module 80. The interactive board uses a frame body 10 in the antenna fixed junction assembly as a support component for the overall structure of the interactive board, and the frame body 10 may surround and define a display region for installing the display module 80. Herein, the frame body 10 may be a sheet metal frame or a profile frame. In this embodiment, the profile frame structure is used as an example, and the display module 80 covers the display region to provide image display function. The frame body 10 serves as the frame structure of the display module 80 and is arranged around the periphery of the display module 80.

The above display module 80 includes an LED (Light Emitting Diode) display screen, an OLED (Organic Light Emitting Diode) display screen, an LCD (Liquid Crystal Display) display screen, etc.

In the disclosure of this application, the functional module of this embodiment uses an antenna module as an example for subsequent specific embodiments. The antenna module includes but is not limited to a Wi-Fi module, a Bluetooth module, and a network module. As shown in FIGS. 1-5 and 9-11, the antenna fixing assembly according to this embodiment includes a frame body 10. As mentioned above, the frame body 10 of this embodiment is a profile frame, and the frame body 10 provides installation space for accommodating various functional modules within the frame body 10 through an intermediate structure. In order to provide space for the antenna module to receive and/or send signals in a state of installing the antenna module, a front side of the frame body 10 (i.e., the "front" direction indicated by the arrow in the figure) is provided with a through hole 11 that communicates with the installation space and the external environment. The structure and arrangement position of the through hole 11 may be determined based on the signal receiving and transmitting region of the antenna body in the antenna module and the position of the antenna module in the installation space, which is not limited by this embodiment.

An installation bracket 20 serves as a main support body for the antenna fixing assembly, except for the frame body 10. At least a part of the installation bracket 20 is installed in the installation space formed by the frame body 10 and may be detachably connected to the frame body 10. The user may assemble the installation bracket 20 into the frame body 10 or remove the installation bracket 20 from the frame body 10. There are two relatively independent components between the installation bracket 20 and the frame body 10. In this embodiment, one side of the installation bracket 20 is arranged close to the front inner wall of the frame body 10, that is, one side of the installation bracket 20 is arranged close to the through hole 11. In one embodiment, a side of the installation bracket 20 close to the through hole 11 is provided with a first installation portion 21, and a first installation gap 213 is formed between the first installation portion 21 and the frame body 10, so as to provide the installation position of the antenna module.

Figure 15:
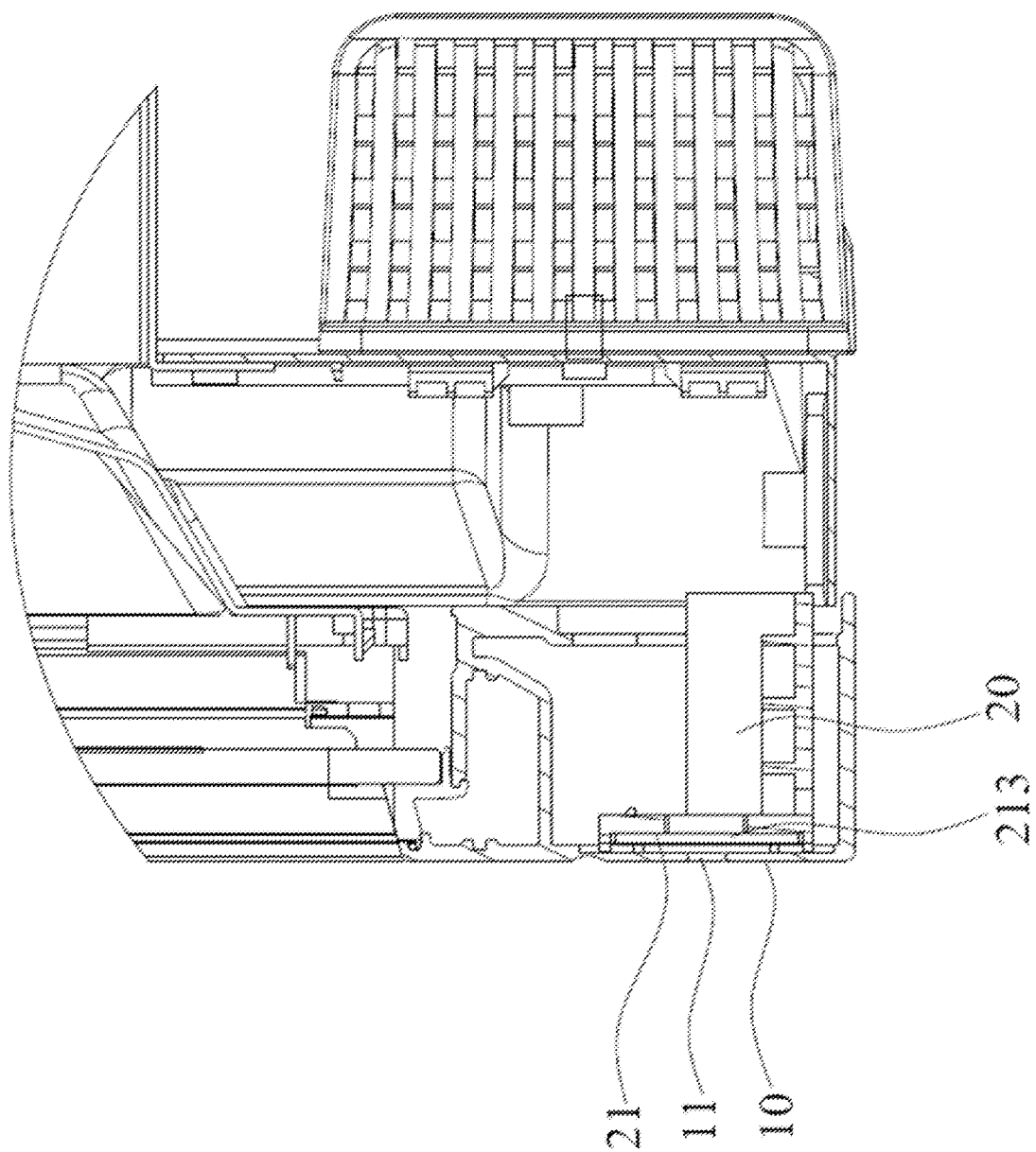
FIG. 15 illustrates a cross-sectional schematic diagram of a coordination state between the frame body and the installation bracket according to some embodiments of the present disclosure.

As shown in FIG. 15, the antenna module is placed in the first installation gap 213, and the antenna module is installed in the frame body 10 to realize hidden installation of the antenna module, which avoids the antenna module being placed externally on the interactive board. The overall appearance of the interactive board cannot be seen, which can achieve a better visual experience and effectively protect the antenna module from accidental contact. The first installation portion 21 may stably place the antenna module on the installation bracket 20 so as to support the antenna module, thereby enabling the antenna module to move with the installation bracket 20. In order to stabilize the assembly state of the antenna module, when the antenna module is assembled on the frame body 10, one side of the part of the antenna module placed within the first installation gap 213 abuts against the first installation portion 21, and the other side abuts against the frame body 10. In this way, the antenna module can maintain relative fixation with the installation bracket 20 and the frame body 10 via the coordination between the installation bracket 20 and the frame body 10, so that there is no relative displacement between the antenna module and the installation bracket 20 or the frame body 10. When the antenna module is assembled on the frame body 10, at least a part of the antenna module corresponds to the through hole 11, which is exposed to the outside of the frame body 10 through the through hole 11. This can avoid interference or shielding of the antenna module signal by components such as the frame body 10, and achieve a good signal effect. The antenna module adopts the above-mentioned coordination and fixing manner of the installation bracket 20 and the frame body 10, it can effectively avoid the misalignment between the antenna module and the through hole 11 arranged on the frame body 10, allowing the antenna module to maintain good signal receiving and sending functions.

In the application of interactive boards, the installation bracket 20 and the antenna module are both arranged inside the frame body 10, which serves as a lower border of the interactive board. It can be understood that, in addition to the front side of the frame body 10 as mentioned above, the through hole 11 of this embodiment may be opened on the lower side, rear side, and both ends of the frame body 10. However, compared with the manner in which the through hole 11 is opened on other sides other than the front side of the frame body 10, the through hole 11 is opened on the front side of the frame body 10 and placed in the middle of the frame body 10, which can make the signal receiving and sending direction of the antenna module faces the front of the interactive board, thereby making the antenna signal receiving and sending direction perpendicular to the display module 80 and facing the corresponding signal source, which can reduce the problem of antenna signal attenuation and signal difference caused by the isolation of the frame body 10, and greatly enhance signal performance.

Using the above assembly structure of the antenna module, the operator may first arrange the antenna module on the first installation portion 21 during the process of assembling the antenna module, so that the antenna module can move with the installation bracket 20. Thus, the installation bracket 20 can provide the operator with a larger operating position compared with the antenna module. The antenna module can move with the installation bracket 20, and the operator can hold the installation bracket 20 to place it inside the frame body 10, so as to facilitate the operator to fix the installation bracket 20 to the frame body 10. During the process of disassembling the antenna module by the operator, the operator only needs to disassemble between the installation bracket 20 and the frame body 10 to remove the antenna module together from the installation space during the process of removing the frame body 10. The installation bracket 20 is easier to be operated than that of the antenna module and less prone to damage compared with the antenna module, which facilitates the operation of the operator during the process of disassembling and assembling the antenna module, reduces the difficulty of disassembly and assembly of the antenna module, improves its efficiency, and further improves the assembly stability of the antenna module on the frame body 10, thereby ensuring that the antenna module remains in normal working condition and extending the service life of the module. Moreover, the antenna module to abutting against the frame body 10 not only makes it more stable, but also ensures the grounding requirements of the antenna module in interactive board applications, ensuring that the original performance of the antenna module will not decrease due to changes in the installation structure.

As shown in FIGS. 3 to 13, an embodiment for stable installation of antenna modules is provided. The first installation portion 21 is an installation slot, which is specifically arranged on the front side of the installation bracket 20. A notch for communicating with the installation slot is arranged on a side of the installation bracket 20 close to the through hole 11, so that a first installation gap 213 may be formed between the bottom of the installation slot and the frame body 10. In the disclosure of this application, in order to ensure that a surface of the antenna module far from the bottom of the installation slot may still abut against the frame body 10 after being assembled in the installation slot, a depth of the installation slot is less than or equal to the thickness of the part of the antenna module arranged in the installation slot, so that when the antenna module is embedded in the installation slot, the surface of the antenna module far from the bottom of the installation slot may protrude from the installation slot or be flush with its notch, which ensures the installation stability of the antenna module.

A shape of the installation slot may match with the antenna module, which can improve the compactness of the overall structure of the antenna fixing assembly and also facilitate the position limitation of the installation slot on the antenna module. As shown in FIGS. 5-7 and 11-13, in order to achieve better limiting of the antenna module by the installation slot and prevent the antenna module from being removed from the installation slot, a size of the first installation portion 21 formed by a slot wall of the installation slot is set to be larger than the outer circumference size of the antenna module, thereby forming a certain gap between the slot wall of the installation slot and the outer wall of the antenna module. Multiple limiting blocks 212 are installed at intervals between the slot wall and the slot bottom of the installation slot. When the antenna module is assembled in the installation slot, the limiting blocks 212 may limit the antenna module, which can abut against the outer wall of the antenna module, allowing the antenna module to be fixed in the installation slot by each limiting block 212 in a wedge-caulking manner. However, due to the limited contact points between the limit blocks 212 and the antenna module, when a certain external force is applied to the antenna module, the antenna module can also smoothly detach from the installation slot without completely wedge-caulked in the slot, thereby ensuring disassembly and assembly between the antenna module and the installation bracket 20 and improving the positioning accuracy of the antenna module.

In order to avoid the excessive force exerted by the installation bracket 20 and the frame body 10 on the antenna module, which may cause the antenna module to be crushed, the installation bracket 20 is located around the circumference of the installation slot and forms a limiting part 22 protruding relative to the bottom of the installation slot. The limiting part 22 surrounds and defines the slot wall of the installation slot. One end of the limiting part 22 is connected to the installation bracket 20, and the other end of the limiting part 22 abuts against the frame body 10 while the installation bracket 20 is assembled on the frame body 10, so as to define a minimum width of the first installation gap 213. During the process of assembling the bracket 20 onto the frame body 10, the limiting part 22 can abut against the frame body 10 to avoid the bottom of the installation slot being too close to the frame body 10, thereby ensuring that the antenna module is not crushed by the bottom of the installation slot and the frame body 10.

In an embodiment, the limiting part 22 and the installation bracket 20 may be in a split structure, and the two may be separately processed and formed, and then are coordinated through corresponding assembly manners (buckle connection, bonding, screw connection, welding, etc.). The limiting part 22 of this embodiment adopts an integrated processing manner with the bracket body. Compared with the separated processing and reassembly manner, the integrated processing manner can better control a distance between the limiting part 22 and the bracket 20, avoiding assembly errors.

In some embodiments, in order to ensure that the distance between the installation slot and the front inner wall of the frame body 10 is maintained at all points, the limiting part 22 is set as a support plate. One end of the support plate is connected to the installation bracket 20, and the other end of the support plate abuts against the frame body 10. Moreover, the support plate is arranged around the through hole 11, and such a manner where the support plate is arranged around the outer circumference of the through hole 11 is adopted, which can increase a contact surface between the limiting part 22 and the frame body 10 to make the force on the limiting part 22 more uniform, and ensure that the installation bracket body does not generate corresponding torque due to the limiting part 22 being only arranged on one side of the through hole 11, ensuring that the force on all parts of the antenna module is uniform, avoiding the problem of unstable installation of one end of the antenna module or damage caused by excessive force on one end of the antenna module.

In another embodiment, in order to avoid external impurities, such as dust, entering the interior of the frame body 10 through the through hole 11, which may affect the internal antenna module, the antenna fixing assembly further includes a cover plate 30. The cover plate 30 is detachably connected to the installation bracket 20 and arranged between the frame body 10 and the antenna module. The cover plate 30 covers the through hole 11 and shields the through hole 11 to prevent foreign objects from entering the installation space through the through hole 11, so that it can also protect the antenna module and reduce damage caused by collisions to some extent. It may be understood that the cover plate 30 may be made of insulating materials to avoid the impact of the cover plate 30 on the antenna signal. For example, the cover plate 30 may be prepared using acrylic plates, which not only do not block the radiation signal of the antenna, but also have high strength and strong aesthetics. In this embodiment, due to the presence of the cover plate 30, the cover plate 30 is placed between the antenna module and the frame body 10. Therefore, herein the cover plate 30 and the first installation portion 21 define the first installation gap 213. In an assembly state, one side surface of the antenna module abuts against the bottom of the installation slot, the other side surface abuts against the cover plate 30, and the other part abuts against the frame body 10 to maintain grounding.

Figure 5:
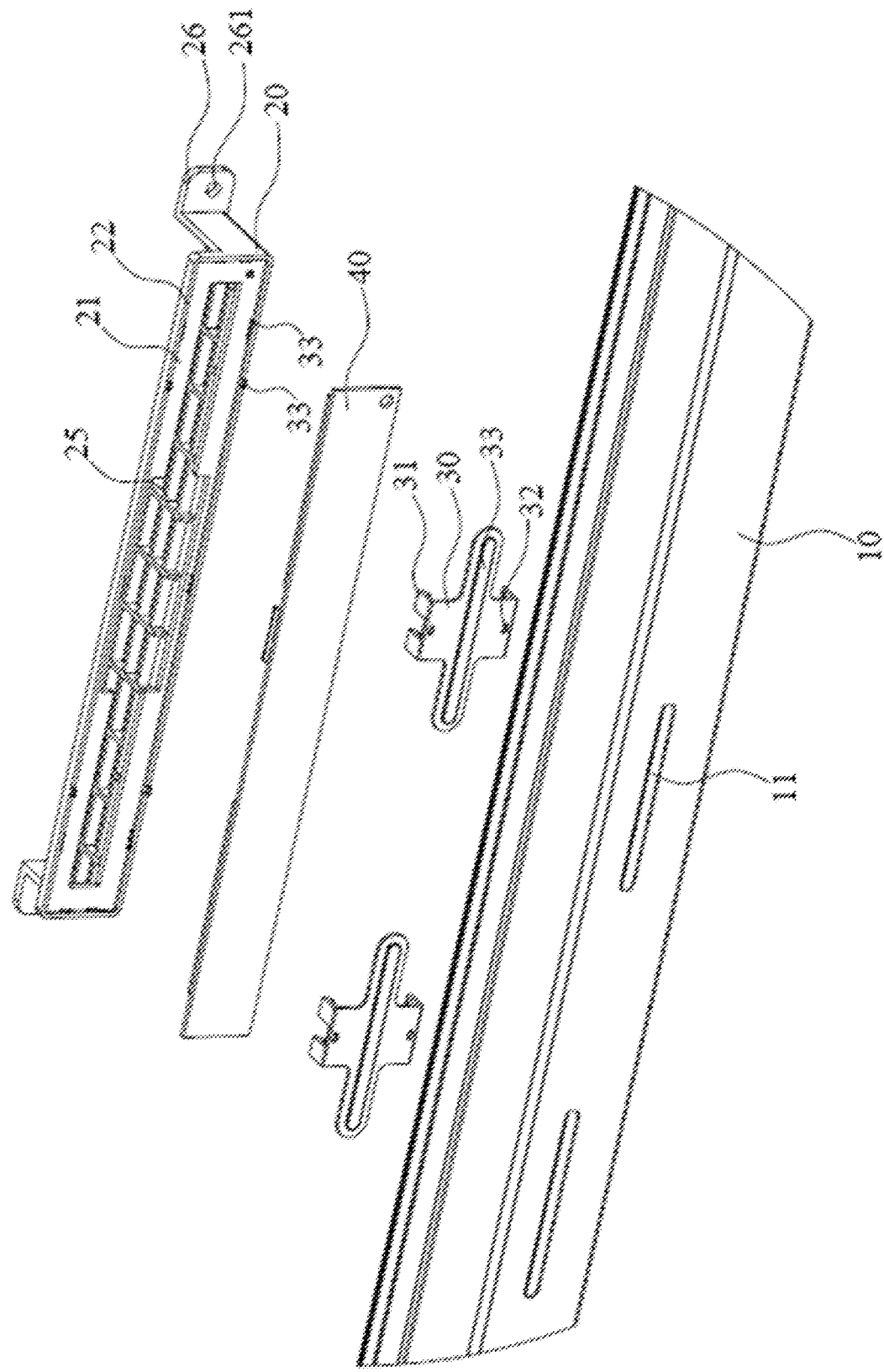
FIG. 5 illustrates another exploded view of the antenna fixing assembly according to some embodiments of the present disclosure.

In this embodiment, in order to improve the positioning accuracy between the cover plate 30 and the frame body 10, and to avoid relative displacement between the cover plate 30 and the frame body 10, a second positioning structure is further installed between the cover plate 30 and the frame body 10. As shown in FIG. 5, the second positioning structure is arranged as a protrusion 33 protruding from the front side of the cover plate 30, and the protrusion 33 has a shape matching the through hole 11. In the assembly state, the protrusion 33 is embedded in the through hole 11. In this way, the cover plate 30 can to some extent limit a relative position of the installation bracket 20 in the installation space, thereby ensuring the accuracy of the installation position of the antenna module and facilitating signal transmission.

The through hole 11 in this embodiment is a long strip structure, and the length direction of the through hole 11 is parallel to the length direction of the frame body 10. In some embodiments, the surface of the frame body 10 is further concave with an appearance groove, and the through hole 11 may also be arranged inside the appearance groove to achieve better hiding effect and improve the product appearance. Moreover, adopting a long strip structure can minimize the reduction of material in other directions of the frame body 10, ensuring the structural strength of the frame body 10 as much as possible, and also meeting the signal transmission and reception requirements of the antenna module.

Figure 6:
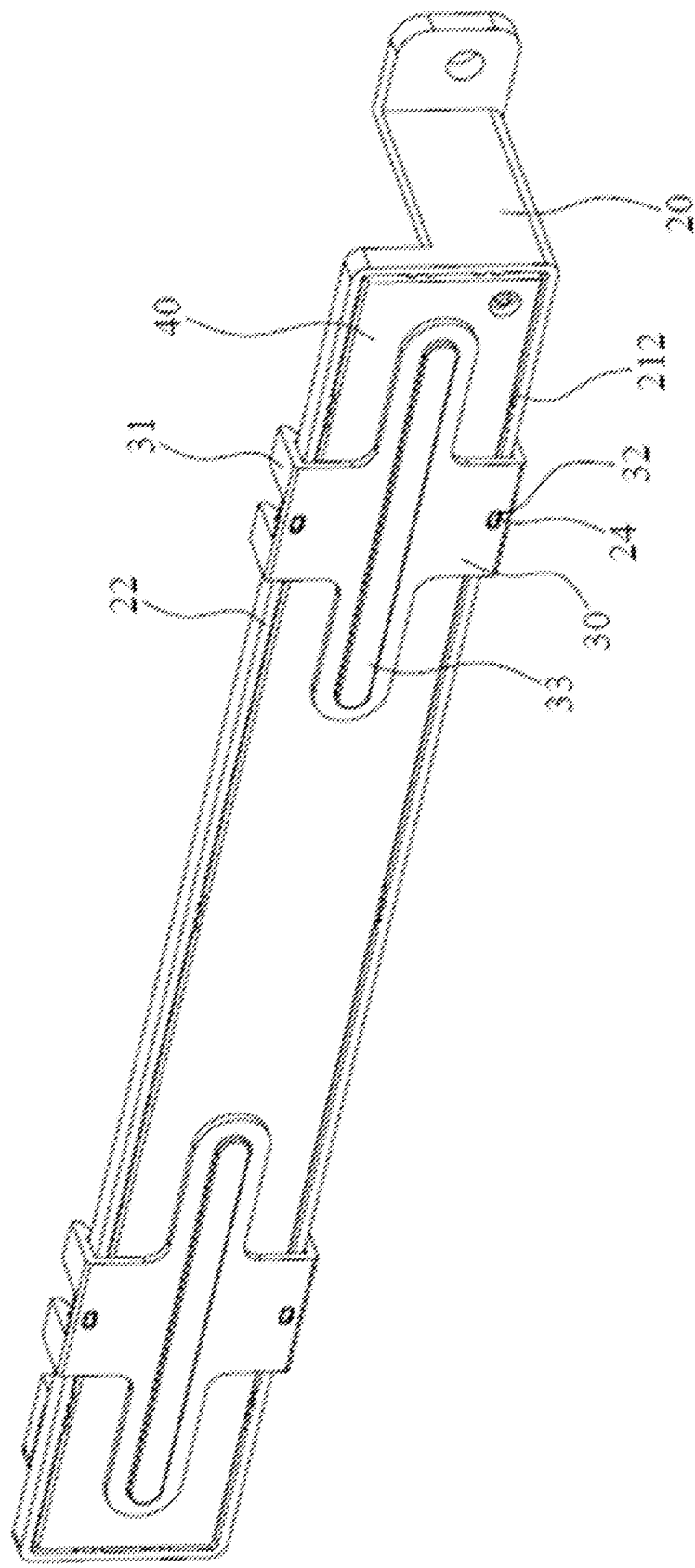
FIG. 6 illustrates an assembly diagram of a first antenna plate and an installation bracket according to some embodiments of the present disclosure.
Figure 7:
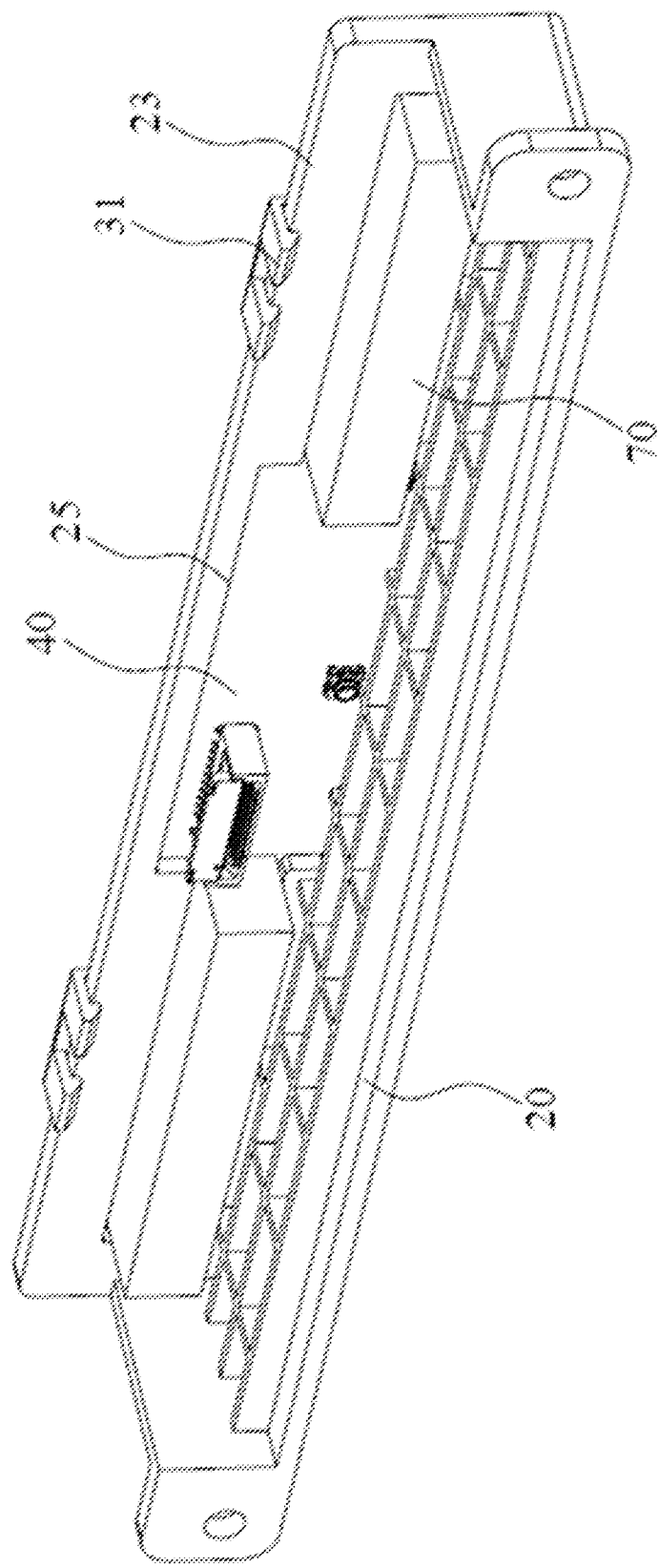
FIG. 7 illustrates another assembly diagram of the first antenna plate and the installation bracket according to some embodiments of the present disclosure.
Figure 8:
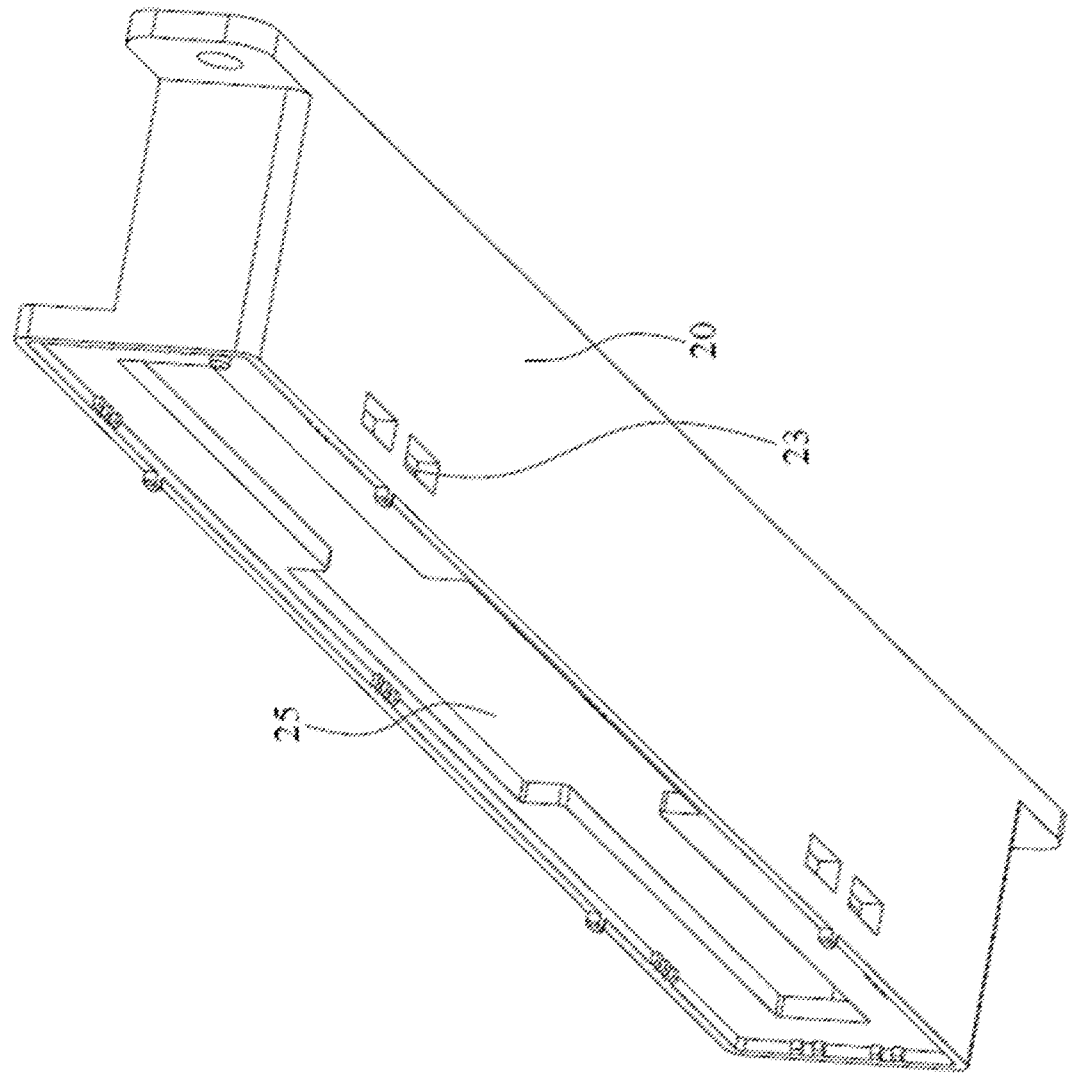
FIG. 8 illustrates a structural schematic diagram of the installation bracket according to some embodiments of the present disclosure.
Figure 9:
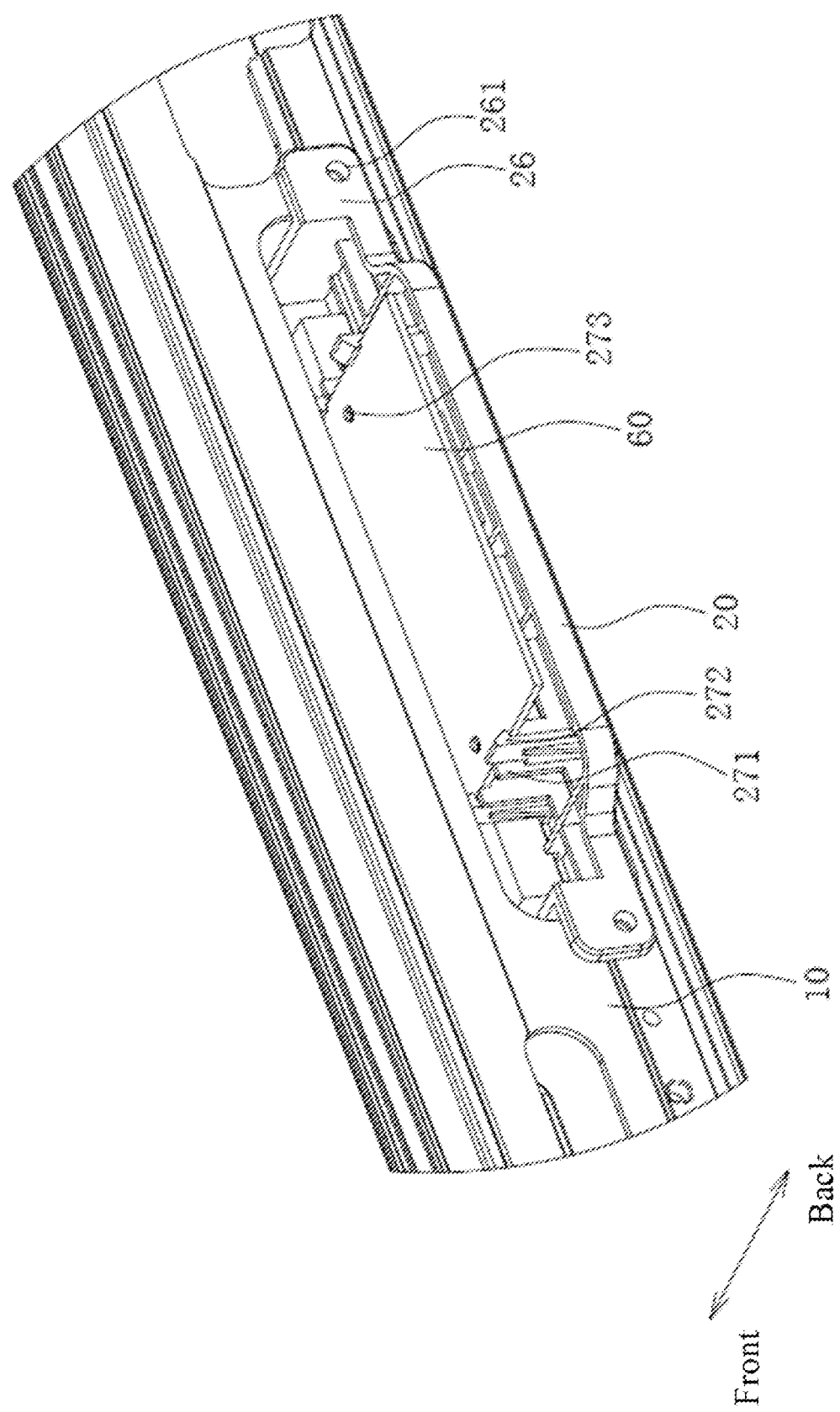
FIG. 9 illustrates another schematic diagrams of the assembly state of the antenna fixing assembly according to some embodiments of the present disclosure.

In order to facilitate the disassembly and assembly of the cover plate 30 and the antenna module, a buckle structure is disposed between the cover plate 30 and the installation bracket 20. The cover plate 30 is connected to the installation bracket 20 through a buckle structure. As shown in FIGS. 6-8, the buckle structure of this embodiment includes a first elastic buckle body 31 and a buckle edge 23. The buckle edge 23 provides a buckling position where the first elastic buckle body 31 is buckled into and pressed against. In order to ensure that the cover plate 30 can be stably assembled on the installation bracket 20, buckle structures are arranged on the opposite sides of the cover plate 30 and the corresponding sides of the installation bracket 20 to prevent the cover plate 30 from flipping out.

As shown in FIGS. 4 to 7, the upper and lower sides of the cover plate 30 are equipped with a first elastic buckle body 31. The first elastic buckle body 31 extends backwards from one end of the cover plate 30, and correspondingly, the upper and lower sides of the installation bracket 20 form a buckle edge 23. As shown on the upper side of the installation bracket 20, a part of the installation bracket 20 has a plate-shaped structure. At this time, the plate edge of the installation bracket 20 may form a buckle edge 23 that provides the first elastic buckle body 31 for being buckled in. Clearly, similar to the lower side of the installation bracket 20, corresponding groove bodies may also be opened on the plate surface to form corresponding buckle edges 23 on the groove bodies, which provides clamping and fixing for a first elastic buckle 31.

In other embodiments, the cover plate 30 may be provided with a buckle edge 23, and correspondingly, the installation bracket 20 is provided with a first elastic buckle 31.

For ease of assembly, the first elastic buckle body 31 is formed with a guide surface where a buckle edge 23 presses against the external structure. During the process of assembling the cover plate 30 on the installation bracket 20, as the cover plate 30 approaches the installation bracket 20, the installation bracket 20 will first abut against the guide surface of the first elastic buckle body 31, in order to push the first elastic buckle body 31 away from the installation bracket 20, and provide the installation bracket 20 to be placed between the upper and lower first elastic buckle bodies 31. When the first elastic buckle 31 moves to the buckle edge 23 and the guide surface crosses the buckle edge 23, the first elastic buckle 31 will lose the force applied by the installation bracket 20 and reset elastically, causing the first elastic buckle 31 to snap onto the buckle edge 23 and press against the surface of the buckle edge 23, completing the assembly of the cover plate 30 and the installation bracket 20.

During the process of disassembling the cover plate 30, sufficient external force is applied to the cover plate 30 or the first elastic buckle 31, ultimately causing the first elastic buckle 31 to detach from the buckle edge 23, thus completing the disassembly of the cover plate 30.

During the process of assembling the antenna fixing assembly, the operator may first place the antenna module in the installation slot and install the cover plate 30 into the installation bracket 20 to complete the position limiting of the antenna module. Then, the entire assembly process is completed by assembling the installation bracket 20 and the frame body 10. In order to ensure that the assembly position of the cover plate 30 can correspond to the through hole 11, a first positioning structure is arranged between the cover plate 30 and the installation bracket 20. The first positioning structure is used to limit the installation position of the cover plate 30 on the installation bracket 20, ensuring that after the installation bracket 20 is assembled on the frame body 10, the cover plate 30 can fully cover the through hole 11, and its protrusion 33 may also be embedded in the through hole 11.

As a positioning manner in an embodiment, as shown in FIGS. 3-8, the first positioning structure includes a first positioning pin 24 and a first positioning hole 32. The first positioning hole 32 provides a positioning space for embedding the first positioning pin 24. When the first positioning pin 24 is arranged on the installation bracket 20, a first positioning hole 32 is arranged on the corresponding position of the cover plate 30. When the first positioning pin 24 is arranged on the cover plate 30, a first positioning pin 24 is arranged on the corresponding position of the installation bracket 20.

In this embodiment, the first positioning hole 32 is arranged on the main body of the cover plate 30, while the first positioning pin 24 is arranged on the outer circumference of the installation slot of the installation bracket 20.

Clearly, the first positioning hole 32 and the first positioning pin 24 may also be arranged on other positions of the cover plate 30 and the installation bracket 20, as long as they can meet the conditions that the first positioning pin 24 can be embedded into the first positioning hole 32 after the assembly of the two, and the position limiting of the cover plate 30 is completed.

Clearly, in the above-mentioned buckle structure, if a corresponding groove is opened on the installation bracket 20 to form a corresponding buckle edge 23 on the slot body, the slot body can also have a positioning effect on the cover plate 30.

As another embodiment for fixing the antenna module relative to the installation bracket 20, the antenna module is attached to the first installation portion 21 through double-sided adhesive 211. The fixing manner of double-sided adhesive 211 and the fixing manner of the limiting block 212 may exist simultaneously or alternatively.

In order to improve the performance of the antenna module, the installation bracket 20 is provided with a pocket hole 25 at a position corresponding to the first installation portion 21, so that the antenna module can be exposed to the first installation portion 21 through the pocket hole 25. The antenna module is equipped with a shielding cover 70 at the position where the pocket hole 25 is exposed. In one embodiment, the shielding cover 70 may be completely covered at the rear of the pocket hole 25, which maximizes the isolation of interference from other functional modules and the frame body 10 to the antenna module signal. The shielding cover 70 may also be placed only at the position where the antenna module is equipped with the antenna body, so that the antenna body can smoothly send and receive signals from the front side of the antenna plate through the through hole 11.

Typically, the frame body 10 is provided with an installation port 12 for communicating to an installation space on a side away from the through hole 11. The installation port 12 provides a disassembly and assembly position for the installation bracket 20. The installation port 12 may be opened on the rear side of the frame body 10. During the assembly process, the installation bracket 20 may enter the installation space through the installation port 12 and continue to move forward with the installation bracket 20, ultimately allowing it to abut against the front inner wall of the frame body 10, and the placing steps for the installation bracket 20 are preliminarily completed. During the disassembly process, the installation bracket 20 may be removed from the installation space through the installation port 12, and the installation bracket 20 may move back to complete the disassembly of the frame body 10. The installation port 12 and the through hole 11 are placed on the front and rear sides of the frame body 10, allowing the installation bracket 20 to move only in the front and rear directions during the disassembly and assembly process. This simplifies the disassembly and assembly process of the installation bracket 20, facilitates the operator to carry out the disassembly and assembly of the antenna module, and improves the efficiency of disassembly and assembly.

In accordance with the above scheme, as shown in FIGS. 3-13, fixing arms 26 are arranged at the opposite ends of the installation bracket 20. When the installation bracket 20 is inserted into the installation space through the installation port 12, the fixing arms 26 may be hung on a rear side of the frame body 10, and the fixing arms 26 can also play a position limiting role on the installation bracket 20. In this embodiment, the fixing arms 26 are two, and the two fixing arms 26 are respectively arranged at the opposite ends of the installation bracket 20, so as to avoid the installation bracket 20 from excessively extending into the installation space, to cooperate with the above-mentioned limiting part 22 to limit the front and rear sides of the installation bracket 20, and to improve the assembly accuracy of the installation bracket 20 within the frame body 10.

The fixing arm 26 and the frame body 10 are assembled and fixed through fixing components. As the fixing arm 26 is hung on the rear side of the frame body 10 after the installation bracket 20 is assembled in place, this embodiment adopts the fixing manner in which the fixing component is connected to the frame body 10 and abuts against the fixing arm 26 against the frame body 10. In an embodiment, the fixing arm 26 is provided with a reference hole 261 passing through the fixing arm 26, and the frame body 10 is provided with a fixing hole 13 corresponding to the reference hole 261 around the installation port 12. The reference hole 261 and the fixing hole 13 may be positioned and installed through a locking component. In one embodiment, the fixing member is a screw, and the fixing hole 13 is a threaded hole that may be connected to the screw, while the reference hole 261 may adopt a light hole structure. During the assembly process, the fixing arm 26 is hung on the rear side of the frame body 10, and the fixing member is screwed and fixed with the fixing hole 13 after passing through the reference hole 261, so that the screw head of the fixing member abuts against the fixing arm 26, thereby fixing the installation bracket 20 to the frame body 10.

By adopting this assembly manner, the assembly stability between the installation bracket 20 and the frame body 10 can be improved, so that the antenna module can be stably abutted against the frame body 10, maintaining the grounding of the antenna module, and ensuring the stability of its performance. Moreover, in the installation structure, the screw head of the fixing member is located on the rear side of the interactive board, which facilitates the operator to disassemble and assemble the installation bracket 20 from the rear side of the interactive board.

After the installation bracket 20 is installed into the installation space through the installation port 12, the antenna fixing assembly will be exposed on the rear side of the frame body 10. Therefore, in the application of interactive boards, when the installation bracket 20 is assembled, the rear side will be covered with a rear cover 90 and a back plate.

In some embodiments, as shown in FIGS. 3-7, the antenna module of this embodiment includes a first antenna plate 40. The first antenna plate 40 is integrally arranged on the first installation portion 21. The first antenna plate 40 of this embodiment is equipped with an antenna body, an antenna circuit, and an interface circuit that are sequentially electrically connected. The antenna body corresponds to a through hole 11, and the interface circuit is used for electrically connecting with the control unit. The antenna body is used for receiving and/or sending antenna signals, and the antenna circuit is used for sending signals received by the antenna body to the conversion circuit or sending signals received by the conversion circuit to the antenna body. The conversion circuit is used to convert the antenna signal into a digital signal and send it to the control unit, or to convert the digital signal of the control unit into an antenna signal and send it to the antenna signal.

This embodiment sets the antenna module as an integrated circuit board, which is conducive to improving the overall compactness and fast disassembly of the antenna fixing assembly.

In another embodiment, as shown in FIGS. 9-14, the antenna module of this embodiment is a split circuit board structure, including a second antenna plate 50 and an interface board 60. The second antenna plate 50 is arranged on the first installation portion 21, and the second antenna plate 50 is provided with an antenna body and an antenna circuit. The antenna body is set corresponding to a through hole 11, and one end of the antenna circuit is electrically connected to the antenna body. The interface board 60 is provided with an interface circuit. One end of the interface circuit is electrically connected to the antenna circuit, and the other end of the interface circuit is configured to be electrically connected to an external control unit.

In this embodiment, due to the separation of the interface circuit to form a separate interface board 60, the length size of the second antenna plate 50 is smaller than that of the first antenna plate 40 arranged as a whole, thereby saving more installation space within the frame body 10, which is beneficial for the layout of the internal functional modules of the interactive board.

In this embodiment, the assembly manner of the second antenna plate 50 may be the same as that of the antenna module and the first installation portion 21 mentioned above. Hereinafter, the assembly manner of the interface board 60 and the installation bracket 20 will be described in detail. As shown in FIGS. 9-13, the installation bracket 20 is provided with a second installation portion on a side away from the through hole 11. The second installation portion 27 provides an installation position of the interface board 60. Similarly, for the convenience of disassembling and assembling the antenna module, the interface board 60 is detachably connected to the second installation portion 27.

In one embodiment, in order to limit the movement of the interface board 60 in the assembling state and to ensure the electrical connection between the second antenna plate 50 and the interface board 60. A limiting plate 271 is provided on the second installation portion 27. The limiting plate 271 extends along a direction perpendicular to the direction of the second installation portion 27. One end of the limiting plate 271 is connected to the installation bracket 20, and the other end of the limiting plate 271 extends away from the direction of the second installation portion 27. Multiple limiting plates 271 may be provided, and thus, multiple limiting plates 271 are moved away from one end of the second installation portion 27 to form a supporting surface for supporting the interface board 60. During the assembly process, the interface board 60 is placed on the ends of each limiting plate 271, thereby limiting the minimum distance between the interface board 60 and the second installation portion 27. The opposite ends of the second installation portion 27 are further equipped with a second elastic buckle body 272. A second installation gap is formed between the second elastic buckle body 272 and the end of the limiting plate 271, and the interface board 60 is placed within the second installation gap.

The number of second elastic buckle bodies 272 is at least two. Taking four the second elastic buckle bodies 272 as an example, the four second elastic buckle bodies 272 are arranged in pairs at opposite ends of the second installation portion 27 to limit the maximum distance between the interface board 60 and the second installation portion 27. In the state of assembling the interface board 60, each second elastic buckle body 272 respectively abuts against the upper side surface of the interface board 60, and the lower side surface of the interface board 60 is supported by each limiting plate 271.

In order to facilitate the assembly of the interface board 60, the second elastic buckle 272 is formed with a guide surface on the side away from the second installation portion 27. The guide surface tilts from top to bottom towards the direction of the second installation portion 27. During the process of assembling the interface board 60, the interface board 60 moves towards the direction close to the second installation portion 27, and after both sides of the interface board 60 abut against the guide surface of the second elastic buckle 272, the opposite second elastic buckles 272 move away from each other by pressing against the guide surface, which provides space for the interface board 60 to be fully placed into the second installation gap. After the interface board 60 passes over the guide surface of the second elastic buckle 272, the second elastic buckle 272 loses the force applied by the interface board 60 and resigns elastically, causing the second elastic buckle 272 to snap onto the interface board 60 and press against the upper surface of the interface board 60 to press the interface board 60 against the end of the limiting plate 271, so that the assembly of interface board 60 and the second limiting structure is completed.

Typically, due to the electrical connection between the interface board 60 and the second antenna plate 50, in order to ensure that the relative position of the interface board 60 and the second antenna plate 50 meets the electrical connection requirements, a second positioning structure is arranged between the installation bracket 20 and the interface board 60. The second positioning structure is used to limit the installation position of the interface board 60 on the second installation portion 27.

As a positioning manner in this embodiment, as shown in FIGS. 10-13, the second positioning structure includes a second positioning pin 273 and a second positioning hole 61. The second positioning hole 61 provides a positioning space for embedding the second positioning pin 273. When the second positioning pin 273 is arranged on the installation bracket 20, a second positioning hole 61 is arranged on the corresponding position of the interface board 60. When the second positioning pin 273 is arranged on the interface board 60, a second positioning pin 273 is arranged on the corresponding position of the installation bracket 20 to ensure that the interface board 60 and the second antenna plate 50 can meet the electrical connection between the two in the assembled state.

In order to improve the assembly efficiency of the interface board 60 and the second antenna plate 50, the second installation portion 27 is adjacent to the first installation portion 21, and the first installation portion 21 and the second installation portion 27 are interconnected. In one embodiment, the first installation portion 21 is vertically arranged on the front side of the installation bracket 20, and the second installation portion 27 is horizontally arranged on the upper side of the installation bracket 20. In this structure, the second antenna plate 50 and the interface board 60 are perpendicular to each other in the assembly state, and the upper side of the second antenna plate 50 is adjacent to the front side of the interface board 60.

Figure 10:
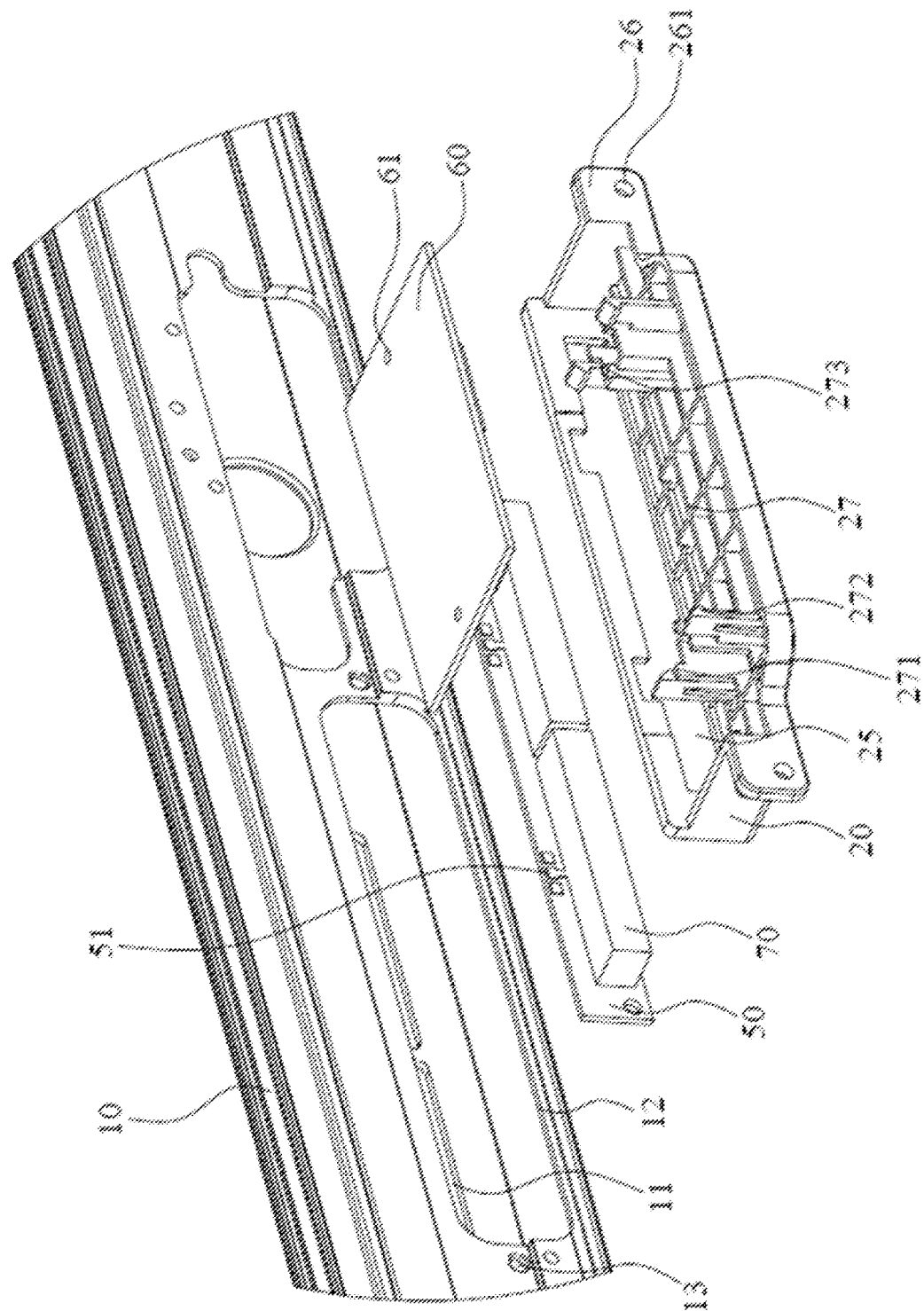
FIG. 10 illustrates still another exploded view of the antenna fixing assembly according to some embodiments of the present disclosure.
Figure 11:
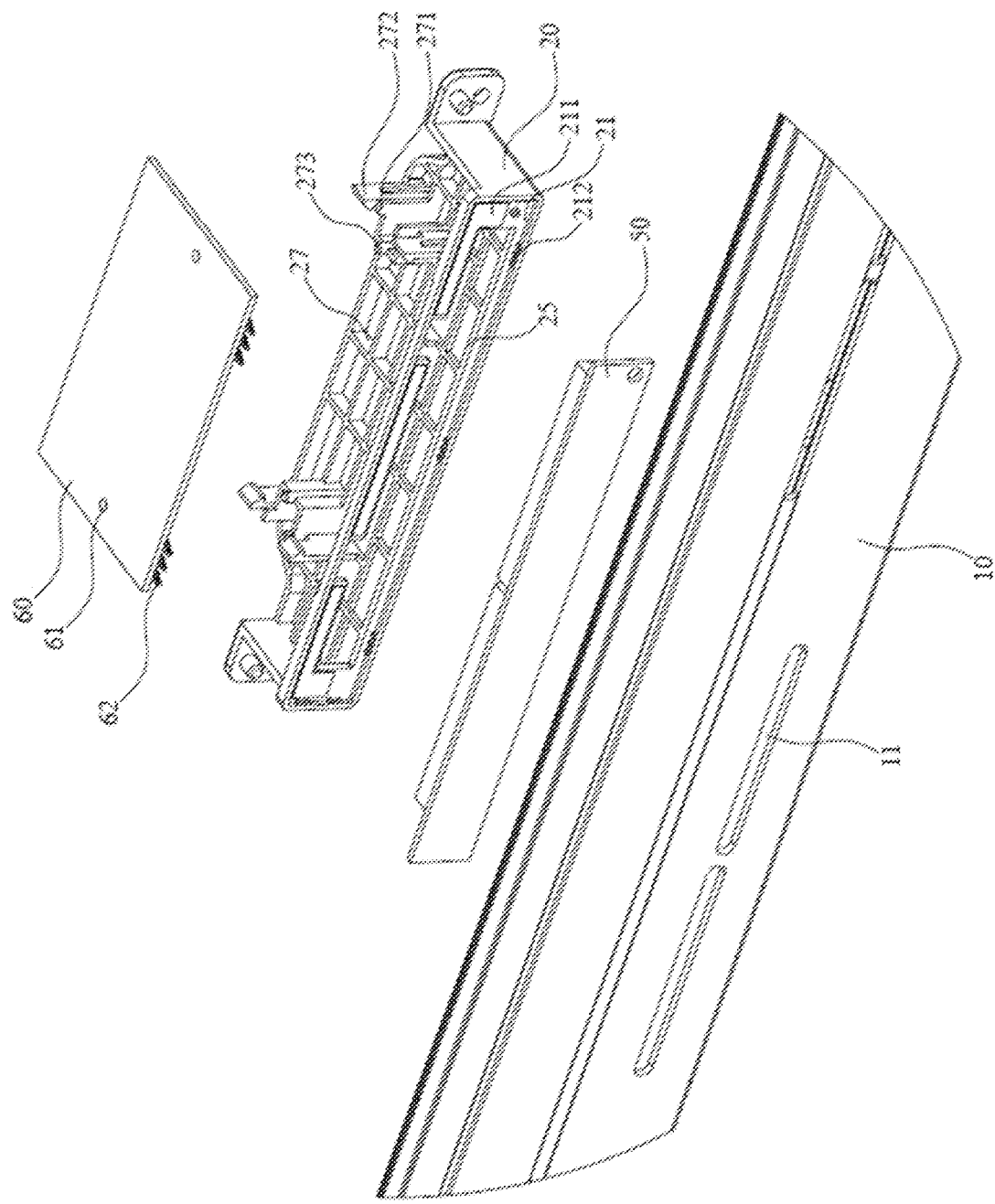
FIG. 11 illustrates yet another exploded view of the antenna fixing assembly according to some embodiments of the present disclosure.
Figure 12:
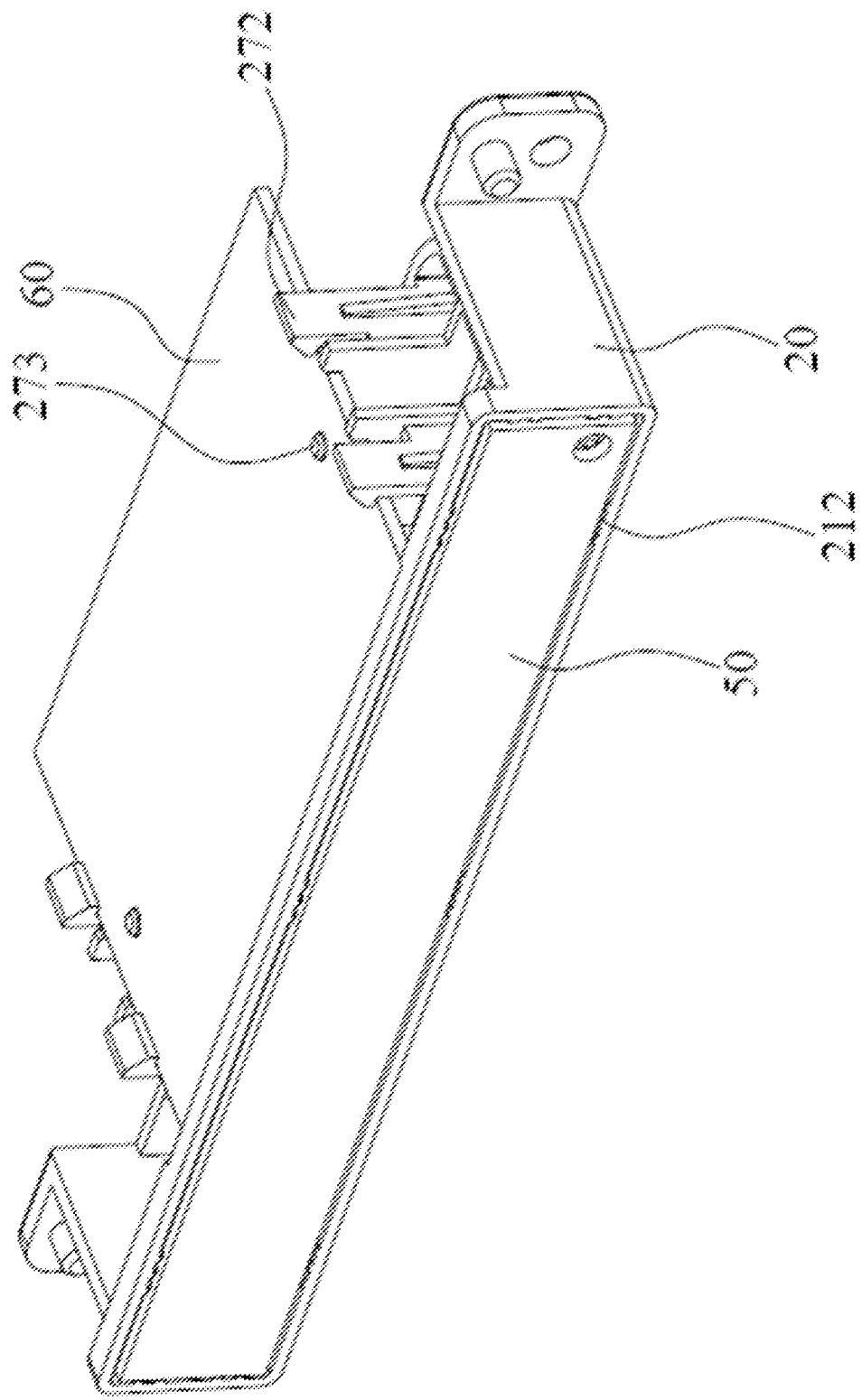
FIG. 12 illustrates an assembly diagram of a second antenna plate, an interface board, and an installation bracket according to some embodiments of the present disclosure.
Figure 13:
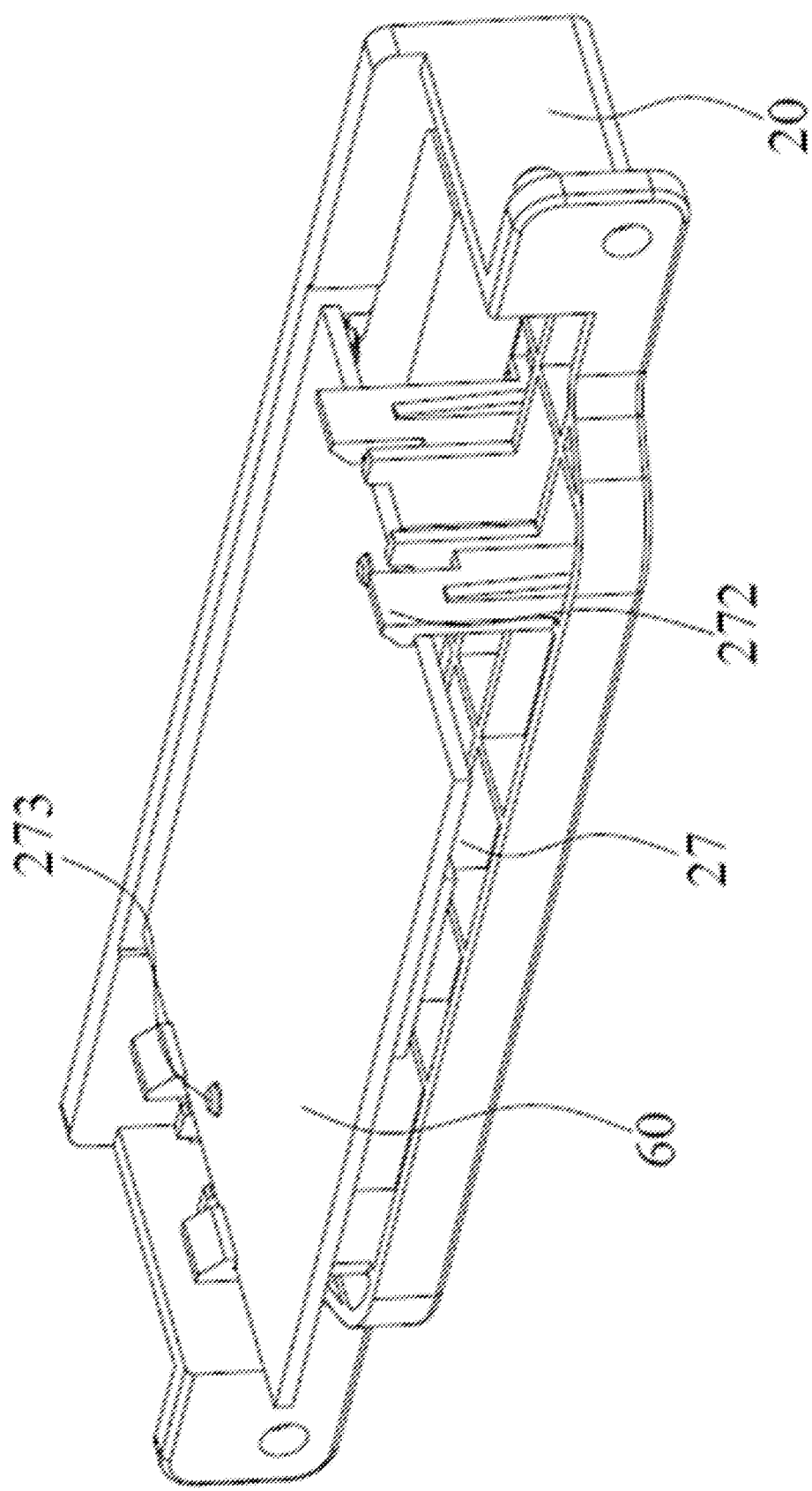
FIG. 13 illustrates another assembly diagram of the second antenna plate, the interface board, and the installation bracket according to some embodiments of the present disclosure.
Figure 14:
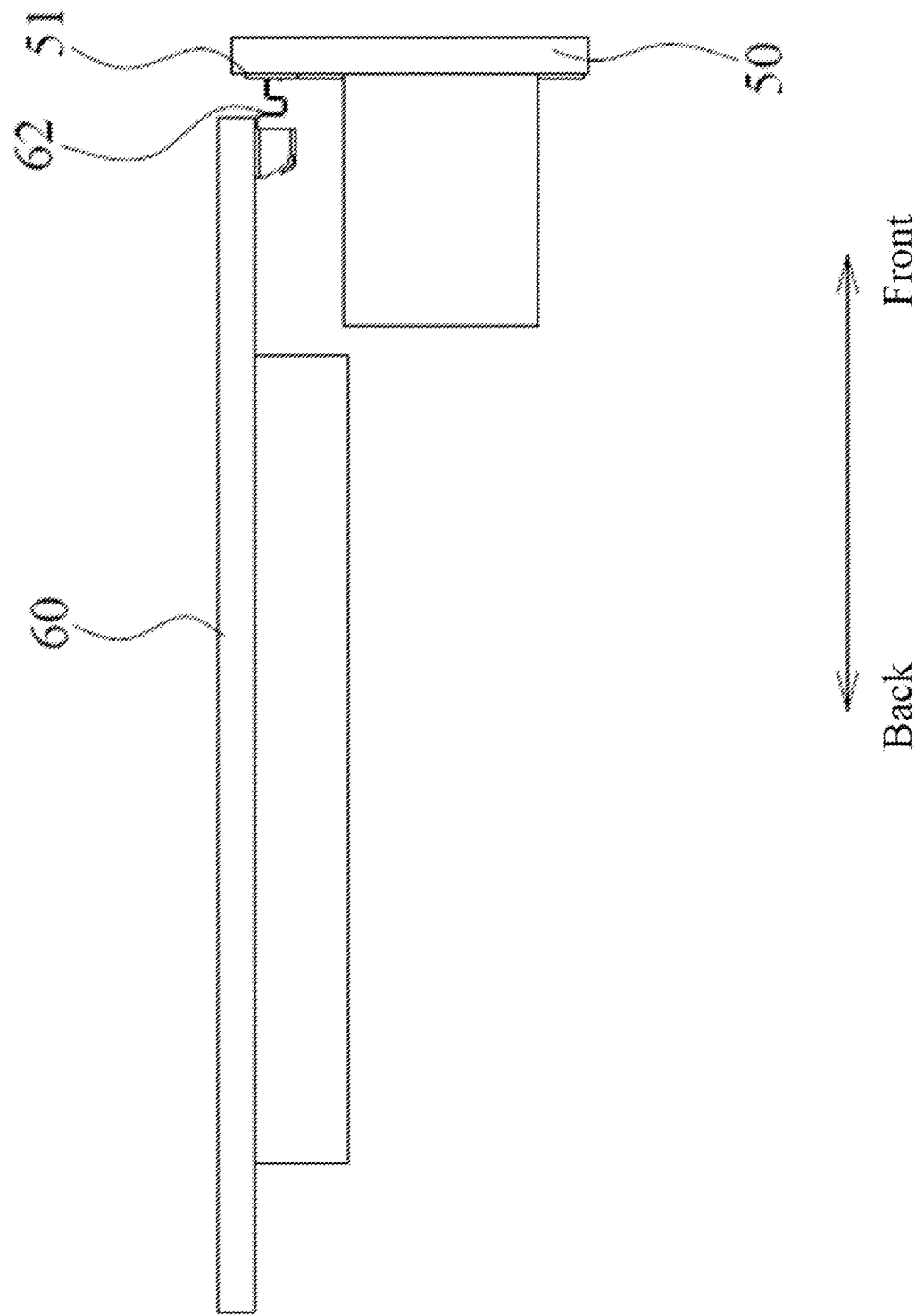
FIG. 14 illustrates a schematic diagram of electrical connection between the second antenna plate and the interface board according to some embodiments of the present disclosure.

As shown in FIGS. 10, 11, and 14, a conductive component is arranged between the second antenna plate 50 and the adjacent side of the interface board 60. The antenna circuit and the interface circuit are electrically connected through the conductive component. In one embodiment, the conductive component includes an electric connection piece 51 and a conductive spring piece 62. The conductive spring piece 62 may collide with the electric connection piece 51 to make the electric connection piece 51 and the conductive spring piece 62 conductive.

When the electric connection piece 51 is arranged on the second antenna plate 50, the conductive spring piece 62 is arranged on the interface board 60. The electric connection piece 51 is electrically connected to the antenna circuit, and the conductive spring piece 62 is electrically connected to the antenna circuit. When the electric connection piece 51 is arranged on the interface board 60, the conductive spring piece 62 is arranged on the second antenna plate 50, the electric connection piece 51 is electrically connected to the interface circuit, and the electric connection piece 51 is electrically connected to the antenna circuit. During the assembly process, the second antenna plate 50 may be first assembled in the second installation portion 27, and then, the interface board 60 is assembled, or the assembly sequence of the two may be interchanged. When the second antenna plate 50 and the interface board 60 are assembled in place, the conductive spring piece 62 will press against the electric connection piece 51 to achieve the continuity between the interface circuit and the antenna circuit, avoiding the need for wiring and other cumbersome operations between the two plate components after assembly, which effectively reduces the assembly difficulty of antenna fixing assembly and improves their assembly efficiency.

Anti-fooling structures are set between the first antenna plate 40 and the first installation portion 21, and between the second antenna plate 50 and the first installation portion 21. The anti-fooling structure of this embodiment includes anti-fooling pins and anti-fooling holes, and the anti-fooling pins and the anti-fooling holes are respectively arranged at the positions corresponding to the first antenna plate 40 and the first installation portion 21, as well as at the positions corresponding to the second antenna plate 50 and the first installation portion 21. In one embodiment, the anti-fooling structure is arranged at one end of the first antenna plate 40 and the first installation portion 21, as well as at one end of the second antenna plate 50 and the second installation portion 27, to prevent the reverse installation of the first antenna plate 40 and the second antenna plate 50.

In summary, adopting the above scheme can effectively reduce the assembly difficulty of antenna modules on electronic devices and interactive boards, facilitate disassembly and assembly by an operator, thereby improving the efficiency of disassembling and assembling the antenna module. It can also ensure that the antenna module can be stably placed in the device, ensure its normal operation, and reduce the failure rate of the device.

In the description of the description, it should be understood that the terms "up," "down," "left," "right," and other orientation or positional relationships are based on the orientation or positional relationships shown in the figures, and are only for the convenience of description and simplification of operation, rather than indicating or implying that the device or component must have a specific orientation, be constructed and operated in a specific orientation, and therefore cannot be understood as a limitation of the present disclosure. In addition, the terms "first" and "second" are only used to distinguish between descriptions and have no special meaning.

In the description of the description, the reference to the terms "an embodiment," "example," etc. means that the specific features, structures, materials, or features described in conjunction with the embodiment or example are included in at least one embodiment or example of the present disclosure. In this description, the schematic expressions of the above terms do not necessarily refer to the same embodiments or examples.

In addition, it should be understood that although this description is described according to the embodiments, not each embodiment only includes an independent technical solution. This description is only for clarity. Those skilled in the art should consider the description as a whole, and the technical solutions in each embodiment can also be appropriately combined to form other embodiments that those skilled in the art can understand.

The above describes the technical principles of the present disclosure in conjunction with specific embodiments. These descriptions are only intended to explain the principles of the present disclosure and cannot be interpreted in any way as limiting the claimed scope of the present disclosure. Based on this explanation, those skilled in the art do not need to put in creative labor to associate with other specific embodiments of the present disclosure, which will fall within the claimed scope of the present disclosure.

What is claimed is:

1. An antenna fixing assembly, comprising:
   a frame body, wherein the frame body provides an installation space for accommodating functional modules, and the frame body is provided with a through hole communicating with the installation space;
   an installation bracket, wherein the installation bracket is detachably connected to the frame body and is at least partially placed in the installation space, and the installation bracket comprises a first installation portion arranged on a side of the installation bracket close to the through hole, and a first installation gap is formed between the first installation portion and the frame body; and
   an antenna module, wherein the antenna module is placed within the first installation gap, and the antenna module is movable with the installation bracket to abut against or detach from the frame body when being assembled on the frame body,
   wherein when the antenna module is assembled on the frame body, the through hole is at least partially aligned with the antenna module so that the antenna module is configured to send and receive signals through the through hole.

2. The antenna fixing assembly of claim 1, wherein the first installation portion is an installation slot, and the installation bracket comprises a notch for communicating to the installation slot arranged on a side of the installation bracket close to the through hole, so that a first installation gap is formed between a bottom of the installation slot and the frame body.

3. The antenna fixing assembly of claim 2, wherein a protruding limiting part is formed in the circumference of the installation slot, and the limiting part surrounds and defines a slot wall of the installation slot; and
   wherein one end of the limiting part abuts against the frame body to define a minimum width of the first installation gap.

4. The antenna fixing assembly of claim 1, further comprising a cover plate, wherein the cover plate is detachably connected to the installation bracket and arranged between the frame body and the antenna module, and the cover plate covers the through hole; and
   wherein the cover plate and the first installation portion together define the first installation gap.

5. The antenna fixing assembly of claim 4, wherein a buckle structure is arranged between the cover plate and the installation bracket, and the cover plate is connected to the installation bracket through the buckle structure; and wherein the buckle structure comprises a first elastic buckle body and a buckle edge, and the buckle edge provides a buckling position for the first elastic buckle body to be buckled in and pressed against.

6. The antenna fixing assembly of claim 4, wherein a first positioning structure is arranged between the cover plate and the installation bracket, and the first positioning structure is configured to limit an installation position of the cover plate on the installation bracket; and wherein the first positioning structure comprises a first positioning pin and a first positioning hole, and the first positioning hole provides a positioning space for embedding the first positioning pin.

7. The antenna fixing assembly of claim 4, wherein a second positioning structure is arranged between the cover plate and the frame body; and wherein the second positioning structure has a shape matching the through hole, so that the second positioning structure is capable of being embedded in the through hole to limit a relative position between the frame body and the cover plate.

8. The antenna fixing assembly of claim 1, wherein the antenna module is attached to the first installation portion via double-sided adhesive.

9. The antenna fixing assembly of claim 1, wherein the installation bracket is provided with a pocket hole at a position corresponding to the first installation portion, so that the antenna module is exposed to the first installation portion through the pocket hole; and wherein the antenna module is provided with a shielding cover at a position where the pocket hole is exposed.

10. The antenna fixing assembly of claim 1, wherein the frame body is provided with an installation port on a side away from the through hole; and wherein the installation port communicates with an installation space and provides a disassembly and assembly position for the installation bracket.

11. The antenna fixing assembly of claim 10, wherein fixing arms are arranged at opposite ends of the installation bracket, and when the installation bracket is inserted into the installation space through the installation port, the fixing arms are hung on a rear side of the frame body; and wherein each of the fixing arms is provided with a reference hole passing through each of the fixing arms, and the frame body is provided with a fixing hole corresponding to the reference hole around the installation port, and the reference hole and the fixing hole are positioned and installed via locking hardware.

12. The antenna fixing assembly of claim 1, wherein the antenna module comprises a first antenna plate arranged on the first installation portion;

wherein the first antenna plate is provided with an antenna body, an antenna circuit, and an interface circuit, and the antenna body, the antenna circuit, and the interface circuit are sequentially electrically connected; and wherein the antenna body corresponds to the through hole.

13. The antenna fixing assembly of claim 1, wherein the antenna module comprises:

a second antenna plate arranged on the first installation portion, wherein the second antenna plate is provided with an antenna body and an antenna circuit, the antenna body corresponds to a through hole, and one end of the antenna circuit is electrically connected to the antenna body; and an interface board provided with an interface circuit, wherein one end of the interface circuit is electrically connected to the antenna circuit, and an other end of the interface circuit is configured to be electrically connected to an external control unit.

14. The antenna fixing assembly of claim 13, wherein the installation bracket is provided with a second installation portion on a side away from the through hole, and the second installation portion provides an installation position of the interface board; and wherein the interface board is detachably connected to the second installation portion.

15. The antenna fixing assembly of claim 14, wherein a limiting plate is arranged on the second installation portion, one end of the limiting plate is connected to the installation bracket, and an other end of the limiting plate extends away from a direction of the second installation portion; and wherein opposite ends of the second installation portion are further provided with a second elastic buckle body, a second installation gap is formed between the second elastic buckle body and the end of the limiting plate, and the interface board is placed within the second installation gap.

16. The antenna fixing assembly of claim 14, wherein a second positioning structure is arranged between the installation bracket and the interface board, and the second positioning structure is configured to limit the installation position of the interface board on the second installation portion; and wherein the second positioning structure comprises a second positioning pin and a second positioning hole, and the second positioning hole provides a positioning space for embedding the second positioning pin.

17. The antenna fixing assembly of claim 14, wherein a conductive component is arranged between the second antenna plate and the interface board, and the antenna circuit and the interface circuit are electrically connected through the conductive component;

wherein the conductive component comprises an electric connection piece and a conductive spring piece, and the conductive spring piece abuts against the electric connection piece to ensure that the electric connection piece and the conductive spring piece are conductive;

wherein when the electric connection piece is arranged on the second antenna plate, the conductive spring piece is arranged on the interface board, the electric connection piece is electrically connected to the antenna circuit, and the conductive spring piece is electrically connected to the antenna circuit; and wherein when the electric connection piece is arranged on the interface board, the conductive spring piece is arranged on the second antenna plate, the electric connection piece is electrically connected to the interface circuit, and the electric connection piece is electrically connected to the antenna circuit.

18. The antenna fixing assembly of claim 1, wherein the through hole is a long strip structure, and a length direction of the through hole is parallel to a length direction of the frame body.

19. An interactive board, comprising an antenna fixing assembly, wherein the antenna fixing assembly comprises:

a frame body, wherein the frame body provides an installation space for accommodating functional modules, and the frame body is provided with a through hole communicating with the installation space;

an installation bracket, wherein the installation bracket is detachably connected to the frame body and is at least partially placed in the installation space, and the installation bracket comprises a first installation portion arranged on a side of the installation bracket close to the through hole, and a first installation gap is formed between the first installation portion and the frame body; and an antenna module, wherein the antenna module is placed within the first installation gap, and the antenna module is movable with the installation bracket to abut against or detach from the frame body when being assembled on the frame body, wherein when the antenna module is assembled on the frame body, the through hole is at least partially aligned with the antenna module so that the antenna module is configured to send and receive signals through the through hole; and wherein the through hole is opened on a front side of the frame body, so that when the antenna module is assembled on the frame body, a signal receiving and transmitting direction of the antenna module is toward a side of the interactive board away from an external installation wall.

20. The interactive board of claim 19, comprising a four-sided border surrounded by a top border, a bottom border, a left border, and a right border, wherein the antenna fixing assembly is arranged at a middle position in a length direction of the bottom border, and the through hole is provided at the middle position in the length direction of the bottom border.

* * * * *